Sept. 5, 1967  W. J. HUMPHREY  3,339,424

AIR ACTUATED CLUTCH ASSEMBLY

Filed Dec. 20, 1965

INVENTOR.
WALTER J. HUMPHREY
BY
*Elliott & Pastoriza*
ATTORNEYS 3,339,424
AIR ACTUATED CLUTCH ASSEMBLY
Walter J. Humphrey, Reseda, Calif., assignor to Kelly-Moore Paint Company, Inc., a corporation of California
Filed Dec. 20, 1965, Ser. No. 514,999
5 Claims. (Cl. 74—230.24)

This invention relates generally to clutches and more particularly to an improved air actuated clutch assembly adapted for use in conjunction with a belt drive.

Many clutch assemblies have been developed for selectively coupling a rotatable shaft to a pulley unit for conjoint rotation to drive an associated mechanism through a flexible belt received over the pulley unit. In most such clutch units, however, the clutching action is effected through metal-to-metal parts independent of the pulley as such. Thus, in some of these clutch assemblies, the pulley unit includes an annular cup member having an internal conical surface adapted to be engaged by an external conical surface of an annular cone member secured to the shaft. The cone member is normally axially slidable on the shaft so as to be movable by a suitable actuating mechanism into and out of frictional engagement with the cup member to accordingly drive the pulley unit with the rotatable shaft when desired.

Since the cup and cone members are normally made of metal, the initial contact therebetween often produces a shock load on the clutch assembly due to a sudden grip or grab of one member upon the other. Repeated clutching operations under such conditions not only contribute to rapid wear on the cup and cone members but also produce stresses on the drive belt and mechanism driven thereby. Other equivalent interengaging metal parts are characterized by the same disadvantages.

Moreover, the metal-to-metal engagement often produces a heat build-up within the clutch assembly, thereby further reducing its operational life and efficiency.

With the foregoing in mind, it is accordingly a primary object of this invention to provide an air actuated clutch assembly characterized by smooth acting engagement of the driving and driven elements to the end that no sudden shock loads are imposed on the clutch assembly and associated equipment.

Another object is to provide an air actuated clutch assembly capable of prolonged and repeated operation without significant wear to the end that frequent adjustment and replacement of the elements of the assembly is not required.

Yet another object is to provide an air actuated clutch assembly of compact, simplified construction.

Still a further object is to provide an air actuated clutch wherein the air actuating unit is rugged and yet constructed of a minimum number of parts.

Briefly, these and many other objects and advantages of this invention are attained by providing an air actuated clutch assembly adapted to be coupled to an end of a rotatable shaft for driving an associated mechanism through a conventional V-belt. It will, of course, be understood that the shaft may constitute the driven element, if desired. The clutch assembly includes an air cylinder unit arrangement providing an expansible chamber in communication with a source of pressurized air.

The clutch assembly further includes a drive unit adapted to receive a V-belt in engagement with an idler bearing which permits the clutch assembly, when disengaged, to rotate with respect to the V-belt. The V-belt is positioned between a pair of spaced, opposed pulley flanges, one of which is axially movable towards the other to smoothly engage the V-belt therebetween for conjoint rotation in response to pressurization of the expansible chamber of the air cylinder unit.

The air cylinder unit includes spring means for moving one of the pulley flanges away from the other to release its driving engagement with the V-belt in response to decrease of pressure within the expansible chamber.

A better understanding of the invention will now be had by referring to a preferred embodiment thereof as illustrated in the accompanying drawings, in which.

Figure 1:
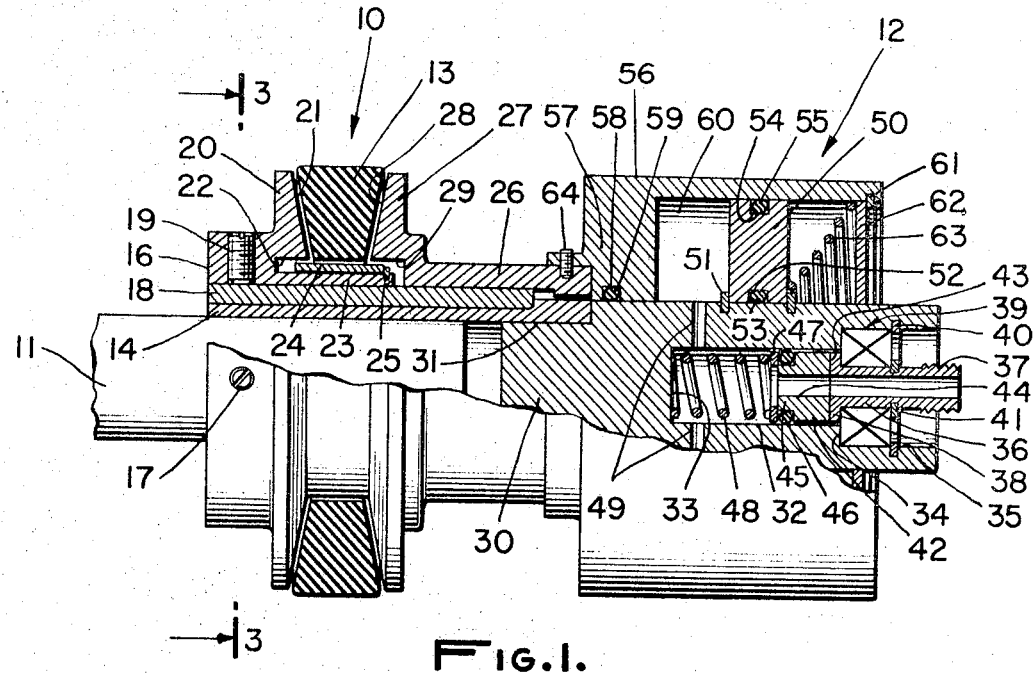
FIGURE 1 is a side elevational view, partly in cross section, of the clutch assembly of this invention in a disengaged position.
Figure 2:
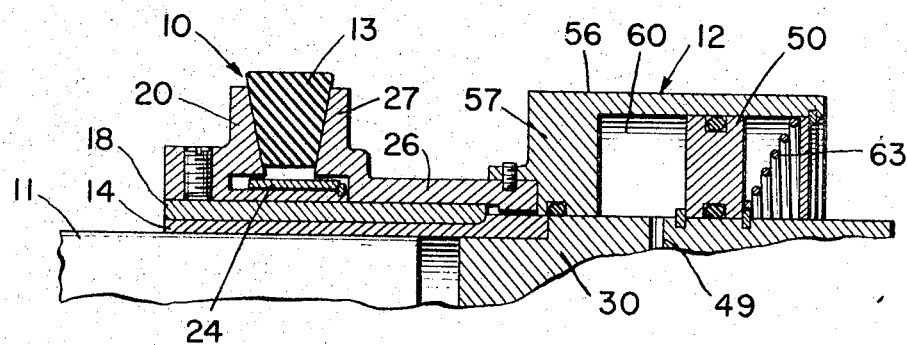
FIGURE 2 is a fragmentary cross-sectional view of the clutch assembly of FIGURE 1 in an engaged position; and, FIGURE 3 is a cross-sectional view taken in the direction of arrows 3—3 of FIGURE 1.

Referring first to FIGURES 1 and 2, the clutch assembly, in a preferred embodiment, generally comprises a V-belt drive unit 10 mounted on a rotatable shaft 11 and an associated air cylinder unit 12 designed to actuate the drive unit 10 to an engaged or disengaged position so as to selectively drive a conventional V-belt 13 mounted on the drive unit 10.

The disengaged position of the clutch assembly is illustrated in FIGURE 1 wherein the air cylinder 12 has been actuated to cause the drive unit 10 to be disengaged from the V-belt 13 to thereby permit the clutch assembly to be rotatable with respect to the V-belt 13.

The engaged or driving position of the clutch assembly is illustrated in FIGURE 2 wherein the air cylinder unit 12 has been actuated to cause the drive unit 10 to engage the V-belt 13 for conjoint rotation.

Figure 3:
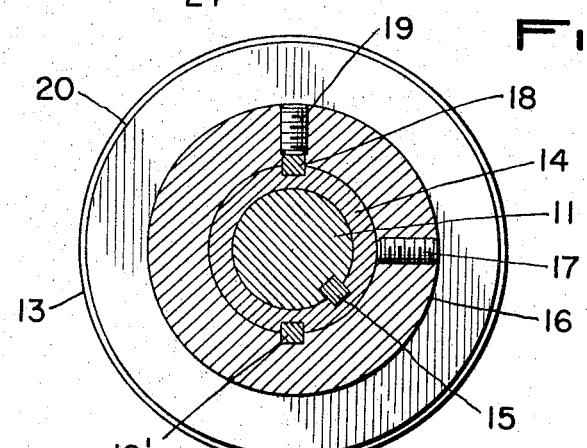

Referring now to FIGURES 1 and 3, it will be seen that the drive unit 10 includes a hub member 14 secured to the shaft 11 by means of an interlocked key 15. An end sleeve 16 is secured to an end of the hub 14 by means including a set screw 17 threadedly received in the end sleeve 16 and engaging the periphery of the hub 14. Further means for securing the end sleeve 16 to the hub 14 includes two interlocking keys shown at 18 and 18′, respectively. The key 18 is held against axial movement with respect to the hub 14 and end sleeve 16 by means of a set screw 19 threadedly received in the end sleeve 16 and engaging the key 18 as shown.

An annular pulley flange 20 is integrally formed with the end sleeve 16 and includes a frusto-conical end wall 21 terminating at its radially inner end in an undercut annular portion 22. The frusto-conical end wall 21 is designed to be engaged by the V-belt 13 when the clutch assembly is actuated to drive the V-belt 13 as shown in FIGURE 2.

Referring still to FIGURE 1, it will be seen that the end sleeve 16 includes a sleeve extension 23 extending axially beyond the pulley flange 20. Rotatably positioned on the sleeve extension 23 is an idler bearing 24 made, for example, of an oil-impregnated bronze material. The idler bearing 24 is axially movable on the sleeve extension 23 and accordingly, a retaining ring 25 is mounted near an end of the sleeve extension 23 for preventing the idler bearing 24 from moving axially off the sleeve extension.

The V-belt 13 is received over the idler bearing 24 such that the clutch assembly is rotatable with respect to the idler bearing and V-belt when the assembly is in the disengaged position shown in FIGURE 1.

The drive unit 10 further includes an axially movable sleeve 26 positioned over the hub 14 and secured thereto for conjoint rotation by means of the keys 18 and 18′. The sleeve 26 terminates at one end in an annular pulley flange 27 having a frusto-conical end wall 28 terminating at its radially inner end in an undercut annular portion 29.

The pulley flanges 20 and 27 are disposed in axially spaced, opposed relationship for receiving the V-belt 13 therebetween as shown. It will be apparent that in the disengaged position shown in FIGURE 1, the pulley flanges 20 and 27 are axially spaced a sufficient distance such that the respective frusto-conical end walls 21 and 28 are out of engagement with the sides of the V-belt 13.

The air cylinder unit 12 will now be described and is best shown in FIGURE 1 wherein a plug member 30 is press-fitted or similarly secured at 31 to an end of the hub 14 opposite the end upon which the end sleeve 16 is secured. Defined within the plug member 30 is a central axial bore or conduit 32 defined at one end by an end wall 33. The plug member 30 further includes an annular shoulder 34 extending radially outwardly from the bore 32 to an enlarged diameter bore 35, which in turn extends axially to the outer end of the plug member 30.

In order to introduce pressurized air into the clutch assembly for operating the same in a manner to be subsequently described, an air inlet pipe 36 is positioned within the bore 35 and extends axially inwardly within the plug member 30 to a point in the bore 32. The air inlet pipe 36 is provided at its outer end with a threaded portion 37 adapted to be coupled to a source of air under pressure (not shown). The air inlet pipe 36 terminates at its inner end in an enlarged diameter annular flange 38 provided for purposes to be subsequently described.

Since the air inlet pipe 36 is adapted to be coupled to a source of pressurized air, it must be held in a non-rotatable position. Thus, suitable means are provided for mounting the clutch assembly for rotation with respect to the air inlet pipe. Towards this end, a ball bearing assembly 39 is positioned within the bore 35 against the annular shoulder 34 and held in position by means of a retaining ring 40 mounted in the bore 35 as shown. The inlet pipe 36 is coupled within the bearing assembly 39 on one side by the annular flange 38 and on the other side by a retaining ring 41 secured to the inlet pipe 36.

The bore 32 houses therein a suitable means for preventing escape of pressurized air from within the clutch assembly. Towards this end, an annular sealing ring 42 is positioned within the bore 32 and includes an annular sealing face 43 positioned against the annular flange 38 of the air inlet pipe 36. Defined through the sealing ring 42 is a passage 44 communicating with the inlet pipe 36. As shown, an end of the sealing ring 42 includes a reduced diameter portion 45 around which is positioned an O-ring 46 which is also in sealing engagement with the bore 32. An annular washer 47 is positioned in engagement with the O-ring 46. A coil spring 48 is in turn interposed between the end wall 33 and the washer 47.

The above-described sealing means is rotatable with the plug member 30 and is arranged such that the spring 48 and air pressure within the bore 32 act to maintain the sealing face 43 in sealing engagement with the flange 38. The O-ring 46 serves to prevent escape of air pressure between the periphery of the sealing ring 42 and the bore 32.

The plug member 30 includes a plurality of circumferentially spaced air passages or bores 49 extending radially outwardly from the central bore 32 as shown. The function of the air passages 49 will become clearer as the description proceeds.

Positioned around the plug member 30 is a stationary annular piston 50 secured thereto by a pair of retaining rings 51. The inner diameter of the annular piston 50 is provided with an annular groove 52 receiving an O-ring 53 therein for providing a sealed engagement between the annular piston 50 and the plug member 30. In a similar manner, the outer diameter of the annular piston 50 is provided with an annular groove 54 receiving an O-ring 55.

A movable cylinder 56 is positioned around the plug member 30 is sliding engagement with the outer diameter of the annular piston 50 and is in sealed engagement therewith by means of the O-ring 55. The movable cylinder 56 includes an annular end wall 57 including an annular groove 58 within which is positioned an O-ring 59 in engagement with the periphery of the plug member 30. The cylinder 56, end wall 57, plug member 30, and the annular piston 50 together define an annular expansible chamber 60 which is in communication with the central bore 32 by means of the air passages 49.

Secured within the movable cylinder 56 near the end opposite the annular wall 57 is a retaining ring 61 against which an annular end plate 62 is positioned. A conical coil spring 63 is positioned between the annular piston 50 and the end plate 62. It will, of course, be apparent that axial movement of the cylinder 56 to the left with respect to the piston 50 will compress the spring 63.

With reference still to FIGURE 1, it will be seen that the movable cylinder 56 is coupled to the sleeve 26 by means of a screw 64 such that the cylinder 56, sleeve 26, and pulley flange 27 are coupled for conjoint axial movement with respect to the remaining structure shown.

In operation and with reference first to FIGURE 1, assuming that the shaft 11 constitutes the driving or input member, it will be apparent that the clutch assembly will rotate with respect to the idler bearing 24 and the V-belt 13. To cause the clutch assembly to drive the V-belt, a line coupled to a source of pressurized air is connected to the threaded end 37 of the inlet pipe 36. Air under pressure is then conducted through the inlet pipe 36, registering opening 44, bore 32, and then radially outwardly through the air passages 49 into the annular expansible chamber 60.

Since the piston 50 is secured to the plug member 30, pressurization of the chamber 60 causes the cylinder 56, sleeve 26, and pulley flange 27 to move axially to the left, thereby compressing the spring 63 between the piston and the end plate 62 as shown in FIGURE 2. The V-belt 13 is thus engaged between the pulley flanges 20 and 27 and moves radially outwardly out of engagement with the idler bearing 24 because of the wedging effect of the frusto-conical surfaces 21 and 28 on the respective sides of the V-belt. This wedging effect enables the V-belt to be engaged and rotated in a smooth, gradual manner, thereby eliminating shock loads on the clutch assembly, V-belt, and the mechanism (not shown) which is driven by the V-belt.

Conjoint rotation of the V-belt with the clutch assembly is maintained during the time the chamber 60 is pressurized, the O-rings 53, 55, and 59 preventing escape of air from the chamber, and the sealing member 42 along with the O-ring 46 preventing escape of air from the bore 32.

To disengage the clutch assembly from the V-belt 13, air pressure is released by a suitable valve means (not shown) connected to the source of pressurized air. The release of air pressure allows the spring 63 to move the cylinder 56, sleeve 26, and pulley flange 27 to the right, thereby permitting the V-belt to move radially inwardly to engage the idler bearing 24 as shown in FIGURE 1. The clutch assembly is thus rotatable with respect to the V-belt and idler bearing.

From the foregoing, it is apparent that this invention provides a clutch assembly capable of engaging a V-belt in a smooth manner to thus prevent shock loads and heat build-up common in existing clutch assemblies. The compact, rugged construction enables the assembly to be operated for prolonged periods without the need for adjustment or replacement of the component parts.

Various changes falling within the scope and spirit of this invention will occur to those skilled in the art. The clutch assembly is therefore not to be thought of as limited to the specific embodiment set forth.

What is claimed is:

1. An air actuated clutch assembly comprising: hub means adapted to be mounted for rotation; air inlet means disposed in said hub means for conducting pressurized air into said hub means; means journalling said hub means for rotation about said air inlet means; piston means mounted on said hub means; cylinder means slidably mounted on said piston means and having end walls slidably engaging said hub means to thereby provide an expansible chamber between said piston means, cylinder means, and hub means; air passage means in said hub means providing communication between said air inlet means and said expansible chamber; a first pulley portion secured to said cylinder means; a second opposite pulley portion secured to said hub means; idler bearing means rotatably disposed around said hub means between said first and second pulley portions for receiving a V-belt thereon whereby said first and second pulley portions are rotatable with respect to said idler bearing means and said V-belt; and, spring means positioned between said piston means and said cylinder means, whereby pressurization of said expansible chamber causes said first pulley portion to move towards said second pulley portion to thereby engage said V-belt therebetween for conjoint rotation and whereby release of pressure from said expansible chamber allows said spring means to move said first pulley portion away from said V-belt to thereby permit the clutch assembly to rotate with respect to said V-belt.

2. The subject matter of claim 1, in which said air passage means includes an axially extending central bore receiving said air inlet means; and a plurality of radially extending bores communicating between said central bore and said expansible chamber.

3. The subject matter of claim 2, including sealing means in said central bore for preventing escape of pressurized air entering said central bore from said air inlet means, said sealing means including a sealing member having an annular end face disposed in relatively rotatable sealing engagement with an end of said air inlet means.

4. The subject matter of claim 1, in which said first and second pulley portions each includes a frusto-conical end wall adapted to engage the respective side walls of said V-belt for moving said V-belt radially out of engagement with said idler bearing means when said first pulley portion is moved towards the other in response to pressurization of said expansible chamber.

5. An air actuated clutch assembly, comprising: a hub adapted to be mounted for rotation; a plug member secured to an end of said hub; an air inlet pipe disposed within an end of said plug member; means journalling said plug member for rotation about said pipe; conduit means in said plug member communicating with said pipe; sealing means in said conduit for preventing escape of pressurized air flowing from said pipe into said conduit; an annular piston secured around said plug member; a movable cylinder positioned around said piston and having an annular end wall in sealed engagement with said plug member, thereby providing an annular expansible chamber defined between said piston and said end wall and between said cylinder and said plug member; air passage means defined in said plug member communicating between said conduit means and said expansible chamber; sleeve means secured to said movable cylinder and being keyed to a portion of said hub for conjoint rotation, said sleeve member terminating in a first pulley flange; an end sleeve secured to said hub and having a second pulley flange spaced from said first pulley flange to provide a space for receiving a V-belt therebetween; an idler bearing rotatably positioned around a portion of said end sleeve extending between said first and second pulley flanges for engaging said V-belt; and spring means positioned between said annular piston and a portion of said movable cylinder, whereby pressurization of said expansible chamber causes said first pulley flange to move axially towards said second pulley flange, thereby engaging said V-belt therebetween for conjoint rotation, and whereby the movement of said first pulley flange is opposed by said spring means whereby release of pressure within said expansible chamber allows said spring means to move said first pulley flange away from said V-belt, thereby permitting said first and second pulley flanges to rotate with respect to said V-belt.

References Cited

UNITED STATES PATENTS

| 2,453,580 | 11/1948 | Lusk | 74—230.24 |
| 2,594,450 | 4/1952 | Koch | 74—230.24 |
| 2,945,574 | 7/1960 | Plume | 192—85 |
| 3,269,200 | 8/1966 | Vaughn et al. | 74—230.17 |
| 3,273,682 | 9/1966 | Schultz | 192—85 |

CARLTON R. CROYLE, *Primary Examiner.*

A. T. McKEON, *Assistant Examiner.*